June 30, 1931.    C. J. WESTLING    1,812,069
VALVE
Filed April 20, 1929    3 Sheets-Sheet 3
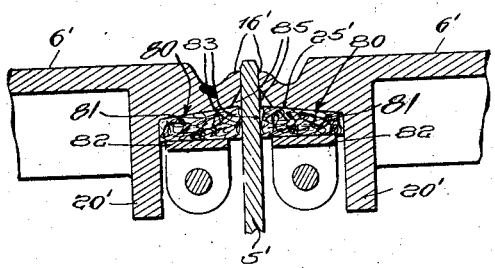
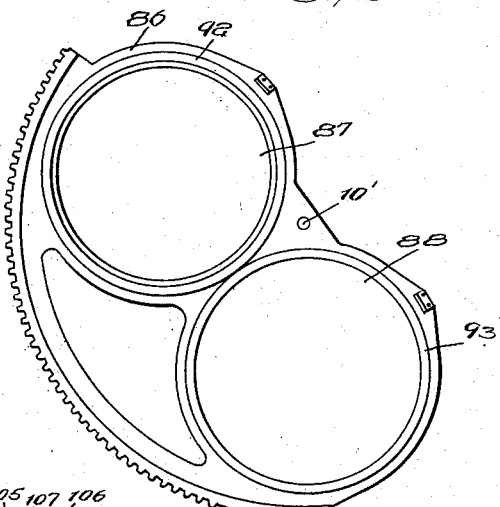
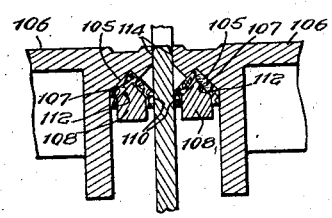
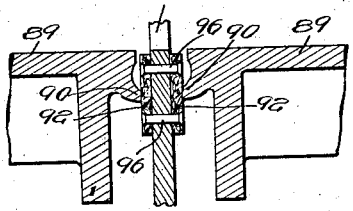
Inventor
Carl J. Westling
By Brown, Jackson, Boettcher & Dienner
Attys Patented June 30, 1931

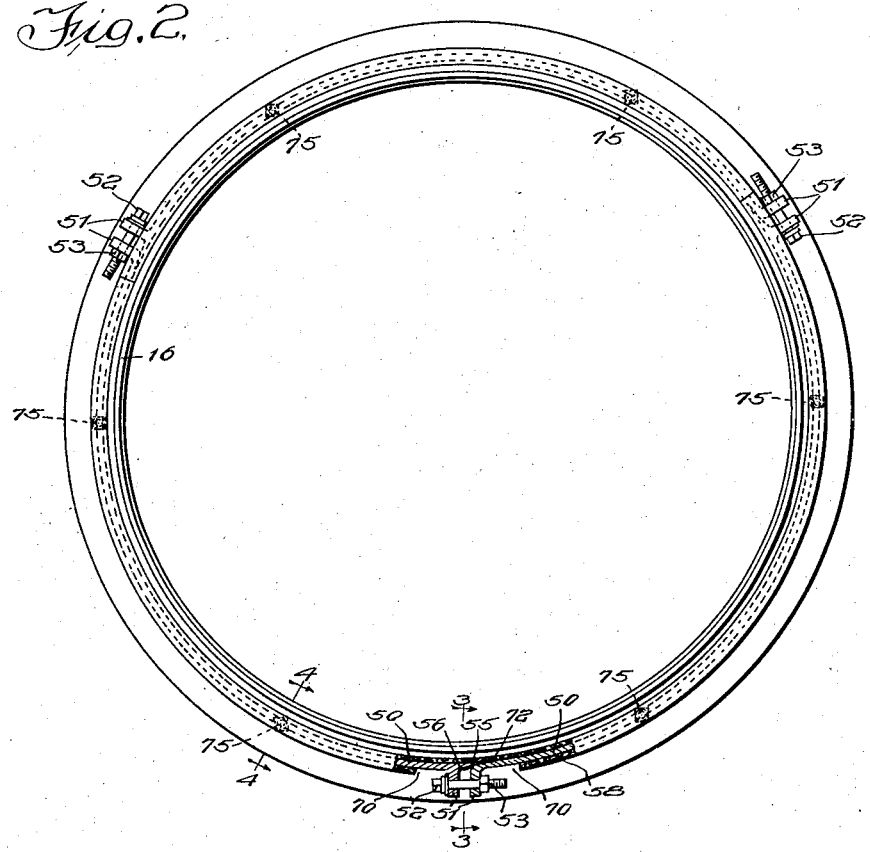
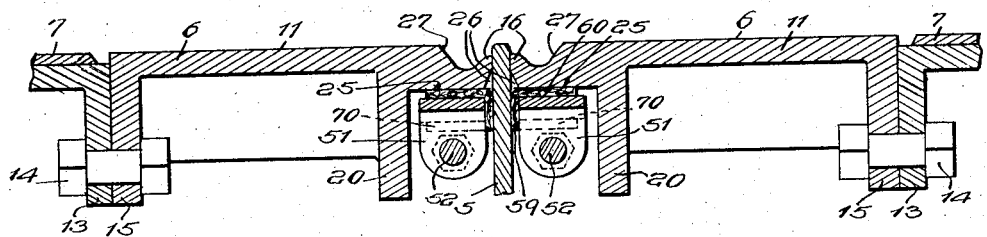
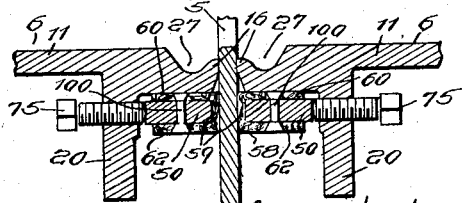

1,812,069

UNITED STATES PATENT OFFICE

CARL J. WESTLING, OF CHICAGO, ILLINOIS

VALVE

Application filed April 20, 1929. Serial No. 356,676.

This invention relates to valves.

More particularly the invention relates to goggle or spectacle valves for blast furnaces or other gas lines for controlling the blast or flow of gas therethrough.

Still more particularly the present invention relates to improvements in the goggle valves of my copending applications, Serial No. 255,275, filed February 18, 1928, and Serial No. 331,641, filed January 10, 1929. I shall describe the present invention in connection with the last of the above referred to copending applications, but it is to be understood that the present invention is not limited to these particular valves but may be employed as suitable or desired.

The primary object of the present invention is to improve the seating and seal between the valve frames and the valve plate members.

Another object is the avoidance of any necessity for machining the valve plate member accurately to finish and the provision of a seating arrangement for obtaining a good tight seal notwithstanding irregularities in the surfaces or thickness of the valve plate member.

Another object is the provision of a seating arrangement in which, at least, one seal may be renewed or repaired without dismantling the valve and more particularly a plural seat arrangement with which the seal may be maintained sufficiently to permit one seat to be renewed or repaired while the valve is in service.

Another object is the provision of an improved plural seal in which the sealing contacts are independently adjustable.

Another object is the provision of a generally improved and simplified sealing construction that may be economically produced and particularly a seal contractable about the valve frame and having sealing contact with the valve plate member.

Other objects and advantages of the invention will appear from the following detailed description taken in connection with the accompanying drawings in which;

Figure 2 is an elevational view, of the inner or valve plate end of one of the valve frames showing, partially in section the additional seal of the present invention in connection therewith.

Figure 3 is a fragmentary longitudinal section taken on the line 3—3 of Figure 2.

Figure 4 is a fragmentary longitudinal section taken on the line 4—4 of Figure 2.

Figure 5 is a fragmentary longitudinal section similar to Figure 4 showing a modification of the present invention.

Figure 6 is an elevational view of a valve plate member showing another modification.

Figure 7 is a fragmentary longitudinal section similar to Figure 4 and illustrating further the modification of Figure 6, and Figure 8 is a view similar to Figure 7 of another embodiment.

Figure 1:
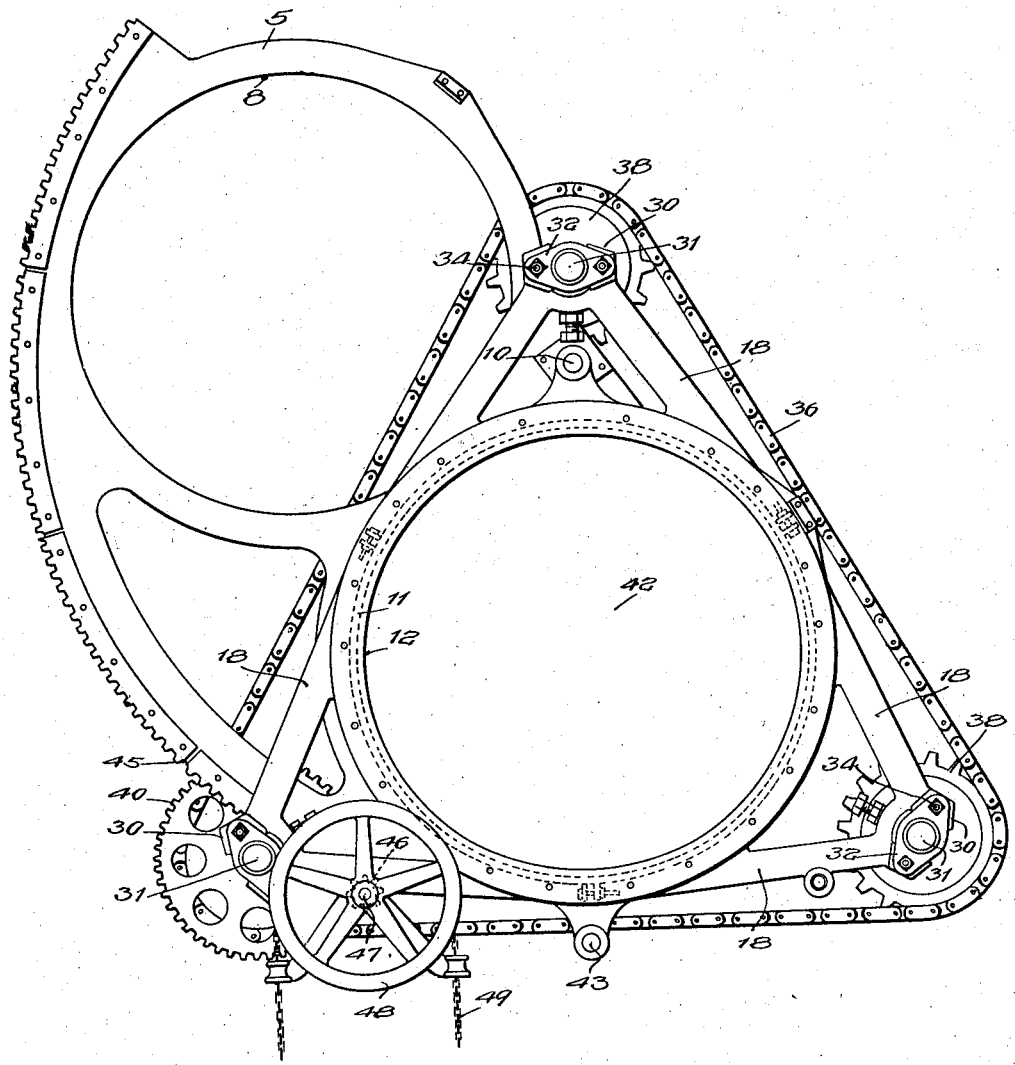
Figure 1 is an elevational view of a valve and valve frame mechanism embodying the present invention.

Referring to the drawings, the valve mechanism shown comprises a valve plate member 5 interposed between two pressure or valve frames 6 which align with and are tightly secured, respectively, to adjoining ends of the pipe sections 7. With the exception of the annular seats or sealing lips 16 the valve frames 6 and their attachment to the adjoining pipe ends 7 may be similar to the frames and attachment more fully disclosed in my copending application, Serial No. 331,641, filed January 10, 1929, and so far as these aspects are desirable to a clear understanding of an embodiment of the present invention the disclosure of that application is incorporated herein by reference and will not be repeated except as seems desirable in the premises. The construction and mounting of the valve plate member 5 as well as the operation of this plate may also follow the disclosure of the above referred to copending application.

Suffice it to say that the valve plate member 5 is provided with an opening 8, which may be moved into or out of registration with the bore of the pipe, to open and close the passage through the pipe by swinging the plate about a suitable pivot corresponding to the pivot 10 shown in Figure 1. The pivot for the valve plate member may be in the form of a dowel pin mounted in the valve frames as in the application above referred to. The frames 6 have ring or collar portions 11 interposed between the ends of the pipe sections 7 and constituting, in effect, the adjacent pipe ends. Due to the construction of the frames 6, the bores or opening through the collars 11 may have the same diameter of opening from end to end as that of the pipe flanges to which the frames 6 are attached. This permits unobstructed flow and eliminates any internal surfaces, pockets, or other obstructions, in or on which dirt or any of the heavier contents of the fluid might collect. The elimination of obstructions also permits flushing out the line and eliminates any possible damming action within the line.

The bores 12 of the collars 11 may register with each other and with the bores of the pipe sections 7, the ends of which may be suitably flanged at 13 and bolted, or otherwise suitably secured, at 14 to abutting circular flanges 15 of the collars 11. As in the application above referred to the second circular flanges 20 of the valve frames provide increased strength and in addition provide at diametrically opposite points integral extensions on the valve frames for the pivot and opposite dowel pins.

The valve plate member 5 is disposed between the adjacent ends of the collars 11, which ends are preferably formed into suitable annular seats or sealing lips 16. These sealing lips 16 instead of being flared outwardly as in the copending application above referred to are preferably directed inwardly to leave the outer cylindrical surfaces 25 without interruption for a purpose which will hereinafter appear and to provide the annular external depressions 26. The formation of the inner valve plate ends of the frames 6 at 27 permits the inward direction of the seating lips 16 without extending these lips into the bores of the frames 6 and the lips 16 may be thinned as shown.

The frames 6 are illustrated as of the girder type, each consisting of a generally triangular ring casting having in addition to the integral hub or ring portions 11, integral tangential bracket arms or beams 18. Forks 30 at the apices of the triangular frame portions support the differential screw or jack units 31 for pressing the pipe ends, that is, the ends 16 of the collars 11, which in effect constitute the pipe ends, tightly against the opposite faces of the valve plate 5 to seal the pipe or main adjacent the sealing contact of the lips 16 with the valve plate 5. The screws or jack units 31 may be adjustably held in the forked apices 30 by the nut flanges 32 and bolts 34 in the manner disclosed in my last above referred copending application and the jack units 31 may be of the form more fully disclosed in that application.

It is believed that the showing of these units 31 in Figure 1 will be sufficient for the purposes of this application. Suffice it to say that each jack 31 has a pair of uni-directional differential threads one operatively connected with each of the valve frames by suitable nuts on the jack units. By rotating the differential screws or jacks a uni-directional differential rectilinear movement is imparted to the pipe ends to press the annular lips 16 tightly against the opposite faces of the valve plate 5 or to relax the pressure of these lips upon the valve plate member so that this member may be swung, for example, from closed to open position. The amount of movement need be only very slight and this is permitted in a run of pipe of this sort or the connections may be sufficiently yieldable to permit this relatively slight movement. The jack units 31 may be connected to be turned together by a continuous chain 36 trained about sprocket wheels 38 and an additional sprocket wheel 40 may be associated with one of the jack units. By applying a hand or motor operated chain to the wheel 40 the jacks may be operated in unison to press the pipe ends against the valve plate or release the pressure to permit swinging movement of the valve plate member. In addition to the opening 8 which may be moved into or out of registration with the bore of the pipe to open and close the passage through the pipe the valve plate 5 has the blank 42 which is adapted to be positioned as shown in Figure 1 to close communication through the pipe.

The valve plate 5 has a toothed margin 45 which meshes with a pinion 46 mounted on a shaft 47 and adapted to be turned by a wheel 48 and operating chain 49. The rotation of the shaft 47 turns the pinion 46 and the pinion 46 by its engagement with the toothed margin 45 swings the valve plate 5 from open to closed position or vice versa.

Surrounding each of the cylindrical surfaces 25 of the valve frames 6 is a split clamp comprising three segmental bars 50 which may be of bar steel rolled or otherwise formed to the desired radius. The segments 50 of the band have adjacent radial lugs 51 through which pass bolts 52 which have threaded engagement with nuts 53 and are adapted for contracting the band tightly about the surface 25 or by removing the bolts 52 the band segments 50 may be separated and removed from the valve frames conveniently and without dismantling the valve. Each of the segments 50 preferably has an integral lapping lip 55 which may be suitably forged at one end of the segment. The inner surfaces of the lips 55 are preferably continuations of the inner surfaces of the main portions of the segments 50 and the outer surfaces are preferably tapered as shown at 56 in Figure 2 and are overlapped by the adjacent ends of the adjacent segments 50.

Each of the clamp segments 50 is provided with a sealing gasket 58. These gaskets 58 which may be made of wire asbsetos or other suitable gasket or packing material are of generally channel section with the base 59 of the channel (Figure 4) disposed adjacent the valve plate member 5 and one leg 60 disposed between the clamp segments or gland rings 50 and the cylindrical valve frame surface 25. The gaskets 58 may be riveted at 100 or otherwise suitably secured to the bars 50.

The opposite or outer legs 62 of the channel shaped gaskets 58 fit over the opposite or outer surfaces of the gland rings 50. To avoid possible interference with the lugs 51 and bolts 52 the outer legs of the channel shaped gaskets 58 may be cut away or terminated short of these lugs as shown at 70 in Figures 2 and 3. The bases 59 and inner legs 60 continue and have abutting endwise engagement at 72 with the bases and inner legs of the gaskets on the adjacent rings 50. The segments or gland rings 50 are preferably each of substantially equal length which disposes the circumferential clamping provisions for the ring equi-distant around the valve frames.

For the purpose of adjusting the gland rings 50 and the bases 59 of the gasket 58 to the opposite surfaces of the valve plate 5 the flange 20 of each valve frame 6 carries a plurality of equally spaced set screws 75 which are threaded through the flanges 20 and engage at their inner ends the outer edges of the clamp or gland segments 50. By simple adjustment of these screws 75 the gasketed inner ends of the gland rings may be adjusted to the opposite surfaces of the valve plate 5 and after adjustment is once made these seats or sealing contacts may be pressed into sealing contact with the opposite sides of the valve plate 5 and released or relaxed therefrom by the screw or jack units 31 and with the seating and unseating of the annular seats or lips 16 upon the opposite sides of the valve plate.

In the event that leakage occurs or it otherwise becomes desirable to do so the gland rings 50 may be adjusted or taken up from time to time to provide a tight closure at all times. The relatively great width of the bars 50 provides relative rigidity in action longitudinally for seating the gaskets at the inner ends of the bars tightly and effectively against the valve plate by the screws 75 and the smaller thickness or radial dimensions of these bars makes them flexible radially so that when the split ring bolts 52 are drawn up the split ring may be tightly contracted upon the surfaces 25 of the valve frames.

With the present arrangement the sealing gaskets 58 have sealing cooperation with the valve plate 5 and with the external surfaces 25 of the valve frames and these gaskets may be depended upon for the primary or real sealing action. The gasket material is preferably relatively yieldable and by the adjustments described may be accommodated to irregularities in the surfaces or thickness of the valve plate so that accurate machining of the plate to finish is unnecessary. These gasketed sealings or gland rings upon being adjusted to the opposite sides of the valve plate will be pressed tightly and firmly against the plate by the action of the screw or jack units 31. The annular lips 16 and split gland rings provide in effect a plural or cumulative seal between the valve frames and the valve plate member and where the split gland ring is relied upon for the main or real seal it will not be necessary to clamp the lips 16 or metal to metal seal as tightly as before. That is, the sealing effect of the lips 16 augments the sealing effect of the gland rings so that the sealing action of the lips and sealing rings are additive or cumulative in effect. The external depressions 26 act as relief recesses for the gaskets 58 so that possible buckling of any portion of the gaskets out of proper sealing engagement with the valve plate when the rings 50 are tightened is avoided.

This enables increasing the pitch of the jack or differential screws and provides for a faster operation. The pressure of the valve frame lips 16 against the opposite surfaces of the valve plate 5 need not be as great as necessary without the additional sealing or gland ring, but it will preferably be tight enough, at least, to permit removal or replacement of the flanged rings 50 while the valve is in service. In other words the lips 16 will seal the line sufficiently at least to permit the removal of the additional sealing or gland rings 50 and renewal or replacement of these rings without taking the valves out of service. The structure of the rings 50 enables removing these rings from the valve frames without dismantling the valve. The yieldable or gland seal is removable while the valve is in operation and is adjustable independently of the sealing lips 16. By contracting the band it is adjusted to the surface 25 and by means of the screws 75 it is adjusted to the surface of the valve plate 5. The jacks may be operated or pulled up to bring the metal lips 16 into the desired contact with the opposite sides of the valve plate and the bands 50 may then be contracted upon the surfaces 25 and adjusted to the sides of the plate, or where the yield ability in the gasketed portions is sufficient, the bands 50 may be adjusted slightly closer than the thickness of the plate, whereupon when these bands are brought up against and into contact with the opposite sides of the plate, by the operation of the differential screws or jack units, these yieldable seats will be compressed very tightly against the valve plate.

In the embodiment of Figure 5 the surfaces 25' of the valve frames 6' are tapered and the cooperating surfaces 80 of the split gland ring or yieldable gasket or sealing material 81 is correspondingly tapered to provide a wedgelike action. Split rings 82 embrace the ring 81 which may also be split if desired and are adapted for contracting the ring 81 tightly upon the surfaces 25'. Obviously, as the rings 81 are tightened upon the surfaces 25' the tapered or wedge-like cooperation between the rings 81 and these surfaces 25' will wedge the inner ends 83 of the rings 81 firmly and tightly against the opposite sides of the valve plate 5'. The main lips are shown at 16' and these lips are preferably disposed outside the internal bores of the valve frames as in the previous embodiment. They are also preferably turned inwardly to avoid interference with the tapered surfaces 25' and are preferably relatively thin. The external annular recesses 85 surrounding the seating lips 16' provide annular relief for the adjacent corners of the gland rings or gland ring members 81 to avoid possible buckling of any of the sealing surfaces of the gland ring out of proper sealing engagement with the valve frame or valve plate in contracting the ring or ring members tightly into place. In the previous embodiment the external annular recesses 26 about the seating lips 16 provide similar relief for the inner corners or inner edges of the gaskets 58.

In the embodiment of Figures 6 and 7 the valve plate is indicated at 86 and is pivoted or swingably mounted at 10'.

The valve frames are indicated fragmentarily in Figure 7 at 89 with the annular lips 90 which may correspond with the seating lips of my copending application, Serial No. 331,641, filed January 10, 1929. The valve plate member 86 has the valve opening 87 for register with the internal bores of the valve pipe ends or the internal bores of the valve frames 89 to provide unrestricted communication therebetween, and with the blank 88 for closing communication between the pipe ends or valve frames. In this case each side of the valve plate 86 is provided with a pair of seating rings 92 and 93 respectively, one pair 92 on opposite sides of the opening 87 and the other pair 93 on opposite sides of the blank 88. When the valve plate is in open position with the opening 87 in register with the internal bores of the pipe ends or with the internal bores of the valve frames one of the seating rings 92 registers with each of the annular seating lips 90 which lips are cooperable with these rings at that time to be pressed firmly against the rings 92 to seal the valve against external leakage along the plate 86. When the valve is closed with the blank 88 closing communication between the pipe ends one of the rings 93 is in register with each of the annular lips 90 and in this position of the valve plate the lips 90 are pressed firmly against the seating rings 93 to close off communication between the pipe ends and seal the valve against external leakage. The seating rings 92 and 93 may be of wire asbestos or other suitable gasket material preferably yieldable to conform and seat tightly against the lips 90.

These seating rings 92 and 93 may be secured to the valve plate in any suitable or preferred manner. Rivets 96 are shown for this purpose in Figure 7 but it is to be understood that this is merely illustrative and may vary as desired. With this arrangement when the valve plate is in position with opening 87 in register with the pipe ends the seating rings 93 may be exposed externally so that they may be renewed or repaired with the valve in service and without dismantling the same. When the valve plate is in position with the blank 88 closing communication between the pipe ends the seating rings 92 may be exposed externally for renewal or repair with the valve in service and again without dismantling the valve.

In the embodiment of Figure 8 the external annular surface 105 of the valve frame 106 is generally V-shaped with the gasket 107 correspondingly formed, as shown. The gasket 107 may be split, as before, and surrounding it is an expansion ring 108. This ring 108, which may be split, is adapted for expanding the gasket 107 into sealing contact with the valve plate 109 at 110 and for tightly compressing the gasket 107 peripherally around the adjacent end of the frame 106. The inner periphery of the ring 108 may be V-shaped at 112 to conform with the gasket formation shown. The metal sealing lip is indicated at 114.

I do not intend to be limited to the precise details nor to the precise applications of the invention shown or described.

I claim:

1. In a valve, the combination of a valve member adapted for controlling a passage and a pair of seats for said valve member, one of said seats being removable while said valve is in service.

2. In a valve, the combination of a valve member adapted for controlling a passage, a pair of seats for said valve member, one of said seats being renewable while said valve is in service and the other seat adapted to seal said valve during renewal of said renewable seat.

3. In a valve, the combination of a valve member adapted for controlling a passage, a pair of seats for said valve member, one of said seats being renewable while said valve is in service, the other seat being adapted to seal said valve during renewal of said renewable seat and both of said seats being adapted for cumulative action in the operation of said valve.

4. In a valve, the combination of a valve member adapted for controlling a passage, a removable valve seat for sealing said valve and means for sealing the valve during removal of said removable seat to permit removal of said seat with the valve in service.

5. In a valve, the combination of a valve member adapted for controlling a passage, a removable valve seat for sealing said valve, means for sealing the valve during the removal of said removable seat to permit removal of said seat with the valve in service and means for adjusting said removable seat relative said sealing means.

6. In a goggle valve, a pair of valve frames, a valve therebetween, a yieldable sealing seat for said valve said yieldable seat being removable with said valve in service, and a rigidly acting sealing seat operable cumulatively with said yieldable seat and adapted for sealing the valve during removal of said yielding seat.

7. In a goggle valve, a pair of valve frames, a valve therebetween, a yieldable sealing seat for said valve said yieldable seat being removable with said valve in service, a rigidly acting sealing seat operable cumulatively with said yieldable seat and adapted for sealing the valve during removal of said yielding seat, and means for adjusting the yielding seat independently of said rigidly acting seat.

8. In a goggle valve, a pair of valve frames, a valve therebetween, a yieldable sealing seat for said valve, said yieldable seat being removable with said valve in service, a rigidly acting sealing seat operable cumulatively with said yieldable seat and adapted for sealing the valve during removal of said yielding seat, and means for adjusting the yielding seat independently of said rigidly acting seat, said adjusting means being carried by the valve frame.

9. In combination, valve frame means having a passage therethrough, a valve member for controlling the passage through said frame means, and means surrounding said valve frame and contractible about said frame for sealing said valve.

10. In combination, valve frame means having a passage therethrough, a valve member for controlling the passage through said frame means, and means surrounding said valve frame and contractible about said frame for sealing said valve, said sealing means having sealing cooperation with the valve frame and with the valve member.

11. In combination, valve frame means having a passage therethrough, a valve member for controlling the passage through said frame means, and means surrounding said valve frame and contractible about said frame for sealing said valve, said sealing means comprising yieldable seating surfaces having sealing cooperation with the valve frame and with the valve member.

12. In combination, valve frame means having a passage therethrough, a valve member for controlling the passage through said frame means, means surrounding said valve frame and contractible about said frame for sealing said valve, said sealing means comprising yieldable seating surfaces having sealing cooperation with the valve frame and with the valve member and means for adjusting the yielding seating surfaces radially and longitudinally relative said frame.

13. In combination, valve frame means having a passage therethrough, a valve member for controlling the passage through said frame means, yieldable sealing means surrounding said frame and contractible about said frame for sealing said valve, and an annular valve lip on said frame concentrically disposed within said yielding sealing means and having sealing cooperation with the valve member.

14. As an article of manufacture, a valve frame having an opening therethrough for communication with the interior of a pipe line, an annular seating lip surrounding one end of said frame for cooperation with a valve member, said frame having a cylindrical surface adjacent the valve member, said sealing lip being disposed internally of said surface, and said cylindrical valve frame surface being disposed externally of the interior of the pipe line.

15. As an article of manufacture, a valve frame having an opening therethrough, an annular seating lip surrounding one end of said frame for cooperation with a valve member and a cylindrical surface on said frame adjacent the valve member, said sealing lip being disposed internally of said surface, and said cylindrical external surface having an annular relief recess adjacent the valve member.

16. As an article of manufacture, a gland ring split into a plurality of segmental parts, yieldable sealing means for said ring, and means for clamping the segmental parts of said ring together to contract same upon a member embraced by said ring.

17. As an article of manufacture, a gland ring split into a plurality of segmental parts, yieldable sealing means for said ring, and means for clamping the segmental parts of said ring together to contract same upon a member embraced by said ring, each of said segmental parts having a lapping lip overlapped by the end of the next adjacent part.

18. In combination, a pair of valve frames adapted to be attached to pipe ends, a valve member operable between said valve frames, annular seating lips on the ends of said valve frames for sealing contact with the valve member, flanges on said frames, split gland rings one embracing the valve end of each of said frames and each comprising a plurality of segmental parts, yieldable gasket means on said rings and having sealing contact with the frames and with the valve member, means connecting the segmental parts of said rings and adapted for contracting the rings upon the valve frames and means carried by said flanges for adjusting said gland rings into sealing cooperation with the valve member.

In witness whereof, I hereunto subscribe my name this 13 day of April, 1929.

CARL J. WESTLING.